(12) United States Patent
Pettersson et al.

(10) Patent No.: US 7,856,942 B2
(45) Date of Patent: Dec. 28, 2010

(54) MILKING DEVICES (75) Inventors: Torbjorn Pettersson, Gnesta (SE); Jan Kassibrahim, Norsborg (SE); Johan Odeberg, Stockholm (SE)

(73) Assignee: DeLaval Holding AB, Tumba (SE)

( * ) Notice: Subject to any disclaimer, the term of this patent is extended or adjusted under 35 U.S.C. 154(b) by 962 days.

(21) Appl. No.: 11/597,716

(22) PCT Filed: Jun. 1, 2005

(86) PCT No.: PCT/SE2005/000824

§ 371 (c)(1),
(2), (4) Date: Mar. 7, 2007

(87) PCT Pub. No.: WO2005/120217

PCT Pub. Date: Dec. 22, 2005

(65) Prior Publication Data
US 2007/0245966 A1   Oct. 25, 2007

(30) Foreign Application Priority Data
Jun. 10, 2004   (SE) .................................... 0401488

(51) Int. Cl.
*A01K 5/06* (2006.01)
(52) U.S. Cl. .................................................. 119/14.47
(58) Field of Classification Search ............... 119/14.47, 119/14.48, 14.49, 14.5, 14.51, 14.52, 14.53
See application file for complete search history.

(56) References Cited
U.S. PATENT DOCUMENTS 3,484,516 A   12/1969   Simons
3,950,483 A    4/1976   Spier
4,459,938 A *  7/1984   Noorlander ............... 119/14.49
4,572,106 A *  2/1986   Mills ....................... 119/14.47

(Continued)

FOREIGN PATENT DOCUMENTS

CN          1242688          1/2000

(Continued)

OTHER PUBLICATIONS

Office Action in Corresponding Japanese Application JP 2007-527131 Dated Dec. 1, 2009.

(Continued)

*Primary Examiner*—Yvonne R. Abbott
(74) *Attorney, Agent, or Firm*—Young & Thompson (57) ABSTRACT

A milking device includes at least a teat-receiving flexible sleeve, adapted to be positioned on/over a teat. A first portion thereof includes a material, selected from the group consisting of thermo-plastic elastomers (TPE), as defined in ISO 18064, and a second portion thereof includes a material selected from the group consisting of thermoplastics. The method of making a milking device, in particular a teat cup liner, is a molding process carried out in two or more steps. In the first step, a thermoplastic, preferably polypropylene (PP) or polyamide (PA), is injected in a mold defining only those portions of the device that are to exhibit a higher stiffness or rigidity, such as couplings. The stiffer parts, are demolded from the mold, and placed in a second mold, into which, as a second molding step, a suitable TPE is injected. Further steps can be performed if required by the design.

20 Claims, 2 Drawing Sheets

U.S. PATENT DOCUMENTS

| | | | |
|---|---|---|---|
| 4,604,969 A * | 8/1986 | Larson | 119/14.36 |
| 4,869,205 A * | 9/1989 | Larson | 119/14.51 |
| 5,595,518 A | 1/1997 | Ours | |
| 6,164,243 A * | 12/2000 | Larson | 119/14.49 |
| 6,176,200 B1 | 1/2001 | Petterson | |
| 6,553,934 B2 * | 4/2003 | Gentner et al. | 119/14.02 |
| 2002/0090476 A1 | 7/2002 | Ling et al. | |
| 2007/0012252 A1 | 1/2007 | Gisslegard et al. | |

FOREIGN PATENT DOCUMENTS

| | | |
|---|---|---|
| DE | 19949151 | 4/2001 |
| EP | 0857435 | 8/1998 |
| JP | S60-001266 | 1/1985 |
| JP | 2001504691 | 4/2001 |
| JP | 2002500023 | 1/2002 |
| JP | 2006510381 | 3/2006 |
| WO | 9819519 | 5/1998 |
| WO | 99/34664 | 7/1999 |
| WO | 00/76298 A1 | 12/2000 |
| WO | 01/45498 A1 | 6/2001 |
| WO | 2004056174 | 7/2004 |

OTHER PUBLICATIONS

English translation of CN Office Action dated Jan. 8, 2010 from corresponding CN 200580019204.9.

* cited by examiner

MILKING DEVICES

The present invention relates generally to devices and components for milking apparatus, in particular to components of such devices such as milk extracting devices, and liners. In particular aspects it relates to a liner comprising a teat receiving flexible sleeve, and optionally a short milk tubing, preferably but not necessarily integrated with the liner, and made from Thermo Plastic Elastomers (TPE), in combination with thermoplastic polymers.

BACKGROUND OF THE INVENTION

Machine milking has been available for about a century. The basic construction of a milking device, which is still in use today is based on an invention patented by Gillies in 1902, and comprises a double chambered teat cup designed to operate with a pulsating vacuum. The teat cup comprises a flexible sleeve made of rubber, forming one flexible wall of a chamber, where the teat cup shell forms the other wall. In the space between the two walls a pulsating vacuum is applied whereby the sleeve will expand and contract, thereby causing a massaging action on a teat on which the teat cup has been applied.

The flexible sleeve is provided as a part of a so called teat cup liner (or inflation in US English; in the present specification and claims the term "liner" will be used throughout).

A milking apparatus as a whole comprises a number of different components, many of which currently are made of different kinds of rubber, e.g. tubing, nozzles, liners etc.

As an example, a modern teat cup system is disclosed in U.S. Pat. No. 6,176,200 (Petterson). It comprises a tubular head portion capable of receiving a teat, and a shaft portion forming an inner wall of the pulsating vacuum chamber. The shaft portion is flexible and normally made of a rubber compound.

In order to be accepted by the market, devices forming the components of milking apparatus, such as teat cups and liners, must exhibit a number of properties. Examples that can be mentioned are the following:

Good milking performances, e.g., milk speed, milk yield, slip, strip yield
Good teat treatment
Long lifetime of the device and capability of functioning at the same high level of performance over the entire lifetime.
Uniform quality of the devices.
Chemical and physical endurance
Devices should be easy to clean
Devices should be easy to replace
Devices should be environmentally friendly, e.g., recycling of the material should be possible
Low energy consumption manufacturing The product must comply with regulations relating to material and to articles and products that are intended to come into contact with foodstuff.

Currently available components of milking apparatus, such as liners and tubing, are most often made of rubber materials, which do not meet the above requirements to a totally satisfactory degree.

Applicants' own PCT/SE03/02024 discloses a novel approach to the manufacture of milking devices by using TPE type materials. The invention disclosed offers a number of advantages over prior art devices and methods.

SUMMARY OF THE INVENTION

Despite the improvement that the above described invention provided, there is still room for further improvement.

The present invention therefore seeks to provide improved devices and components usable in milking apparatus that meet all the requirements listed above. The invention shall also enable even more versatile tailoring of devices. This is achieved in accordance with the invention in a first aspect by a milking device which is defined in claim 1, namely by making a milking device from a combination of a soft and a hard material, namely TPE and thermoplastic material, respectively.

Preferably, the milking device is an improved teat cup liner.

Thus, there is provided a milking device comprising at least a teat-receiving flexible sleeve, adapted to be positioned on/over a teat. It is characterized in that at least a first portion thereof comprises a material, selected from the group consisting of thermo-plastic elastomers (TPE), as defined in ISO 18064, and in that at least a second portion thereof comprises a material selected from the group consisting of thermoplastic materials.

The milking apparatus is defined in claim 15.

In a third aspect there is provided a method of manufacturing a milking device, the method being defined in claim 16.

The devices according to the invention exhibit the following advantages:

Due to the selection of materials in combination according to the invention, the ingress gates and burrs normally occurring in molding processes can be eliminated or at least substantially reduced, which means that time-consuming after-treatment for finishing purposes can be eliminated, thereby reducing the production cost.

The two-step molding according to the invention, again due to the specific material selection according to the invention, surprisingly achieves extremely smooth transitions between the different materials in connecting parts of the molded device, i.e. the different materials integrate in a manner that creates no grooves or depressions, where bacteria or other micro-organisms could thrive, and pose a potential contamination risk. Thereby the strict hygiene requirements on this kind of equipment are met well beyond what is required by current regulations.

Furthermore, by using harder or stiffer materials for those parts that are subjected to stronger forces, the amount of material required can be reduced, compared to the prior art devices. E.g. snap fit couplings can be made with much less material. Harder materials also offer better tolerances in components. Also, there will in general be a larger freedom in construction/design options.

A particular feature worth mentioning is that variations in the parameters influencing teat massage can be reduced with the materials according to the invention.

A liner, as it is designed today, has different parts performing different functions. The sleeve will work dynamically, whereas the connection to the claw will work statically and has the function of a sealing. In one embodiment it is suggested according to the invention that the short milk tubing and the attachment against the teat cup central be made from a stiff/rigid material. This would render the attachment simpler by means of a quick coupling, in a broad sense, which is much easier to achieve with a rigid material than with soft rubbery material. The sleeve, on the other hand, is made from a soft rubbery material for the purpose of achieving optimal massaging and milking properties.

For the particular application of the inventive concept to (teat cup) liners, there are a number of specific and unexpected advantages of using TPE.

Namely, production related advantages are e.g.: the production cost will be more attractive; it will become easier to obtain closer tolerances in the produced items, thus it will become easier to predict the properties of the final product; the material spillage can be reduced; less variations in the production process gives more uniform product properties from batch to batch; use of the materials according to the invention will make welding possible as a production means. However, the most unexpected property is the high resistance to fatigue.

Environmental advantages to be mentioned are: recycling of production scrap material is possible directly back into production by granulating the spillage; lesser amounts of potentially harmful additives, thereby making handling will become less hazardous for staff, e.g. no vulcanization gases will be present.

Further scope of applicability of the present invention will become apparent from the detailed description given hereinafter and the accompanying drawings which are given by way of illustration only, and thus not to be considered limiting on the present invention, and wherein.

DETAILED DESCRIPTION OF PREFERRED EMBODIMENTS

For the purpose of this application, a "milking device" as the term is used throughout this application, is taken to mean any device used in milking systems.

The expression "liner" or "teat cup liner" is taken to encompass a device usable together with a milking apparatus or system, that is to be used in the dairy business e.g. in contact with the milk, and therefore must comply with regulations relating to materials and articles intended to come into contact with foodstuffs. A liner comprises at least a teat receiving flexible sleeve, adapted to be positioned on/over a teat, suitably in a close fit. At the end proximal of the teat receiving end, there can be provided a short milk tube, to be attached to the teat cup central. It can also comprise a supply tubing for pulsating medium, referred to as a "pulsation tubing". It is to be noted that the liner according to the invention may be used for various different animals, e.g. cows, buffalos, sheep and goats and other ruminant animals.

"A teat cup" is taken to be a device comprising a housing, "teat cup shell" in which a liner, as defined above is mounted or formed as an integral part thereof. In particular a teat cup can be a milk extracting device, i.e. a device constituting a part or component of a milking apparatus that acts on the teat of an animal, or cooperates with other parts of the milking apparatus, such that the udder will release milk in a controlled manner. A teat cup comprises a liner, which in its turn comprises at least a flexible teat receiving sleeve, adapted to be positioned on/over a teat in a close fit.

For the purposes of the present application, the expression "thermoplastic polymer" is given the ordinary meaning of that term within the field of polymer technology. Currently, in the present invention, semi-crystalline thermoplastic polymers are preferred, although other types of thermoplastic polymers are possible. Typical examples of preferred thermoplastic polymers are polyolefins (polypropylene, polyethylene etc) and polyamides. It can also encompass copolymers of polyolefin monomers, and it can further comprise various types of fillers, such as glass fibers, carbon fibers, mineral fibers, metal fibers etc, or other conventional fillers usable in polymers. It should be noted that thermoplastic materials are taken to be a class of materials distinct from TPE polymers.

Figure 1:
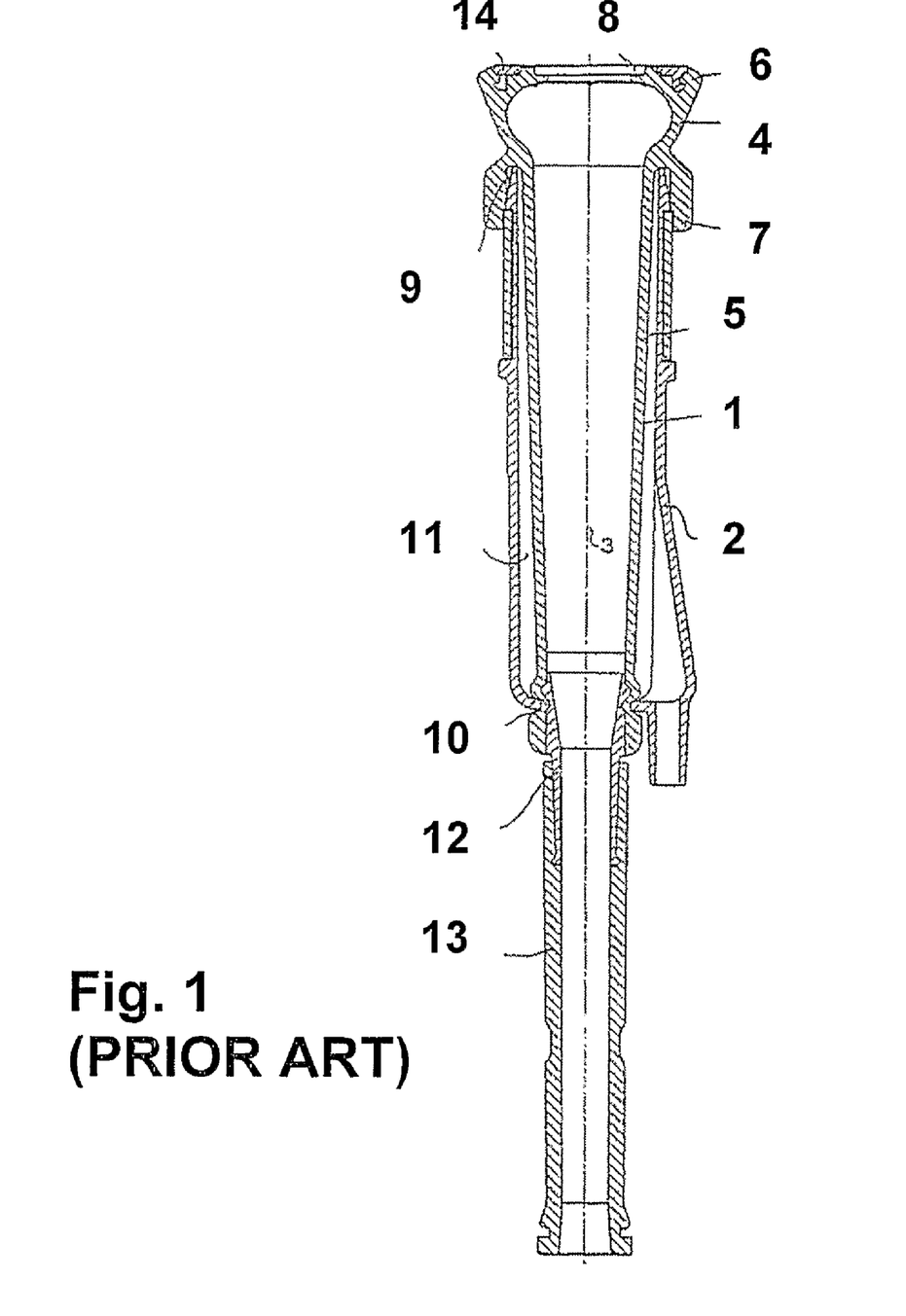
FIG. 1 shows an example of a prior art device for a milking apparatus, namely a teat cup and a liner.

In FIG. 1, an exemplary prior art teat cup is disclosed. It is provided with a teat cup liner 1 which is mounted in a teat cup shell 2. The teat cup liner 1 is essentially rotationally symmetrical with respect to a longitudinal axis 3 and comprises an upper tubular head portion 4 and a tubular, flexible teat receiving sleeve portion 5 extending downwardly from the head portion 4. The head portion 4 comprises a first upper end 6 and a second lower end 7. At the upper end 6, the tubular head portion 4 comprises a lip 8 extending radially inwardly and defining an essentially circular central opening. The tubular head portion 4 forms a passage through the head to the inner space of the teat cup liner for receiving a teat in the sleeve 5. The lower end 7 comprises an annular recess 9 which is engaged by the upper end portion of the teat cup shell 2. The lower part of the sleeve 5 comprises a peripheral surrounding recess 10 which is engaged by the lower end portion of the teat cup shell 2. The recesses 9 and 10 are shaped in such a manner that a closed space 11 is formed between the teat cup liner and the teat cup shell 2, which space 11 forms a pulsating chamber of the teat cup. In its lower part, the teat cup liner 1 connects to prolongation pieces 12 and 13, which form a milk conduit which may be connected to a claw (not disclosed). The teat cup liner 1 is manufactured in an elastic material, for instance natural or synthetic rubber.

In accordance with the present invention, by the surprising flexibility in the employment of the class of materials discussed herein, broadly defined by the specified material properties, and exemplified by thermoplastic elastomers, in combination with thermoplastics, such as polyolefins (polypropylene (PP), polyethylene (PE) and the like) or polyamides (PA), it will in particular become possible to manufacture devices exhibiting different mechanical and physico-chemical properties in different parts or regions of the device, thereby enabling a tailoring of properties for specific uses. Thereby different portions, i.e. a first portion, a second portion etc, can be made of different materials. In particular, TPE in a first portion can comprise a thermoplastic material which is compatible with and preferably very similar to the thermoplastic material in a second portion.

The term "compatible" is taken to have the meaning in a broad sense that the ordinary skilled man in the field of polymer technology would give it.

On the internet at http://www.fiberset.com/html/glossary/glos_c.htm the following meaning of compatible is to be found: "The ability of different resin systems to be processed in contact with each other without degradation of end product properties".

Another meaning of compatible is "capable of being used with or connected to other devices or components without modification".

These additional meanings are taken to be encompassed within the definition commonly used in the polymer filed.

In the particular case of this invention, the result of the compatibility is that the two materials in different portions of the device will form a joint that is very much like a weld. Preferably the materials are very similar or even practically identical.

In preferred embodiments the TPE material has a hardness of 50-90 shore A, and a tensile strength of 4-8 MPa.

The invention is based on the finding that although the TPE materials usable for milking devices, as disclosed in PCT/SE03/02024, increase the design possibilities for milking devices in general, and teat cup liners in particular, they are nevertheless not so versatile from a design or constructional point of view as one could wish for.

The inventors have surprisingly discovered that thermoplastcis (such as polypropylenes, polyerthylenes and/or polyamides) in combination with TPE materials will open up a new dimension of constructional/design possibilities. Thus, by selecting TPE's and thermoplastics having suitable properties, these materials can be combined in a large number of ways. On one hand, different parts can be made from different materials and combined and integrated, i.e. by mechanical (physical) connection of separate items, but also, by using co-injection techniques, composite products having superior properties can be made.

A brief summary of TPE materials suitable for use in the invention will first be given.

Thermoplastic Elastomers (TPE)

Before the development of TPE:s there were generally speaking only rigid or semi-rigid articles products that could be manufactured and processed with the new technology for thermoplastics. The production of thermoplastics is faster, less energy consuming, cleaner and it is easier to re-use scrap.

For elastomeric materials there was a lack of alternatives for thermoset rubbers. For applications not exposed to extreme temperatures there is no fundamental need for temperature resistant crosslinking-sites. The use of thermoset rubbers will have the accompanying disadvantages of the crosslinking.

The incentives for developing thermoplastic materials exhibiting elastic properties without any permanent crosslinking sites have therefore been strong.

Thermoplastic elastomers (TPE) are materials that combine the processing properties of a thermoplastic material with the elastomeric properties of a rubber material.

Thermoplastic elastomers are two-phase systems. One of the phases is a hard polymer that gives the mechanical strength at service temperatures but becomes fluid when heated above the melting- or glass transition temperature ($T_g$). The other phase is a soft rubbery polymer.

There are principally two ways to achieve the properties; namely by providing the material in the form of block copolymers or polymer blends.

Block copolymers meeting the definition of thermoplastic elastomers consist of two phases, one hard and one soft, formed from segments in the same chain of a molecule. The harder segment could be crystalline with a high melting temperature or an amorphous material with a high glass transition temperature. The soft segment is always amorphous with a very low glass transition temperature.

TPE made from polymer blends, are blends of a hard material, almost exclusively semi-crystalline with a high melting temperature in a continuous phase blended with a softer at least mainly amorphous material with a very low glass-transition temperature.

According to ISO 18064 TPE means Thermo Plastic Elastomers in general. The exact definition given in ISO 18064:2003(E) is as follows:

"TPE: Thermoplastic elastomer, consisting of a polymer or blend of polymers that has properties at its service temperature similar to those of vulcanized rubber but can be processes and reprocesses at elevated temperature like a thermoplastic."

Thermoplastic Vulcanisates (TPV)

Thermoplastic vulcanisates (TPV) are two-phase systems consisting of a thermoplastic continuous phase and a crosslinked rubber as the discontinuous phase. The dominating system is PP/EPDM but there are also PP/NBR systems. The rubber phase is more vulcanised than TPO:s where the rubbery phase is just partly or not vulcanised. The vulcanisation of the rubber phase results in numerous property improvements.

General Properties of TPV Materials:

| | |
|---|---|
| Density (kg/dm3) | 0.9-1.0 |
| Shore Hardness | 35A-50D |
| Low temperature limit ° C. | −60 |
| High temperature limit (continuous) ° C. | 135 |
| Compression set resistance at 100° C. | G |
| Resistance to hydrocarbon fluids | G/E |
| Resistance to aqueous fluids | G/E |
| Price ratios | 2.5-3.0 |

Thermoplastic Olefins TPO:s

Thermoplastic olefins, as defined by ISO, are blends of polypropylene (PP) and ethylene-propylene copolymer (EPM) or ethylene-propylene-diene polymer (EPDM). The term EP(D)M covers both EPDM and EPM.

PP-EP(D)M blends are produced by intensive mixing of PP and EPDM and/or EPM.

The polypropylene is normally an isotactic homopolymer or an isotactic PP with minor content of ethylene. The melting point of these semi-crystalline polymers are in the range 145-165° C.

A TPO can therefore retain many of its mechanical properties at high temperatures.

An EP(D)M with 50:50 ratio ethylene and propylene are almost completely amorphous although both polyethylene and polypropylene are semi-crystalline polymer. Changing i.e. the ethylene content to a higher ratio gives some crystallinity. The net effect of a small amount of ethylene crystallinity greatly influences the strength of the rubber.

Properties:

Since PP and EP(D)M can be blended in any ratio, there is theoretically a continuous spectrum from lightly modified thermoplastic PP to EP(D)M reinforced with thermoplastic.

TABLE 3

Comparison TPO-grades

| Property/TPO | EP(D)M/PP 80/20 | EP(D)M/PP 67:33 | EP(D)M/PP 50/50 |
|---|---|---|---|
| Tensile strength (Mpa) | 6 | 9.5 | 12 |
| Shore A Hardness | 77 | 87 | 95 |
| Brittle point | <−60° C. | <−60° C. | <−60° C. |
| TPO Strong points | Service temperature range −60-125° C., low brittle point, high impact strength, High E-modulus. Good resistance to polar organic fluids. | | |
| TPO weak points | Low elasticity, low elongation at break, high compression set. Poor resistance to hydrocarbons and halocarbons. Drying needed before processing. | | |

In accordance with the present invention, a milking device, and in particular a teat cup liner, as defined previously, is made of a material including one or more materials in combination selected from a group of materials including the above discussed, and thermoplastic materials. The thermoplastic materials that are contemplated comprise any material selected from polyolefins, such as polypropylene, polyethylene etc; and polyamides. These materials (TPE vs) differ in properties mainly in terms of their flexibility. Thus, those portions or parts of the device that need to be soft, e.g. the teat-receiving parts of a teat cup liner for a milking apparatus, e.g. the membrane portion located on the top of the device, said membrane having a teat receiving opening are made of TPE's. Also, in case the device has a short milk tubing connected or integrated therewith, such tubing is also preferably made of a TPE.

Those parts having a connecting function, i.e. couplings and the like, in particular snap fit couplings for connecting the milk tubing to a liner or parts having a supporting function, are made of a stiffer material, such as thermoplastics, such as polyolefins (e.g. polypropylene, polyethylene) or polyamide.

The following list contains examples of properties that a liner having a flexible sleeve based on TPE, and that is connectable to the teat/animal and to the overall milking system should exhibit.

- It must be capable to remove milk from the udder of an animal by means of vacuum means
- It should be capable of transporting milk within closed systems
- It should be connectable via an interface to the overall milking system
- The teat should be subjected to massage
- The flexible sleeve should stimulate the animal
- The flexible sleeve should comply with regulations relating to materials and articles intended to come into contact with foodstuffs
- The flexible sleeve should be able to act as a barrier and should not be influenced by the milk
- The flexible sleeve should have a tension or compression being constant or variable
- It should exhibit a sealing function
- The flexible sleeve should be attachable to the teat automatically or manually
- The flexible sleeves functionality should be controllable
- The flexible sleeve is based on a material that should withstand the milking environment
- The flexible sleeve is based on a material that should be processable
- The flexible sleeve should be possible to fix and seal against an outer hard shell
- The flexible sleeve should fit teats of all sizes
- Preferably the flexible sleeve should consist of one or many material or combinations thereof
- The flexible sleeve is based on a material that consists of TPE or TPE in combination with other materials
- Smooth milk-transport should be allowed The above criteria are met with a liner having at least a flexible sleeve made of a material that comprises a TPE, as defined in ISO 18064.

The thermoplastic elastomer material (TPE) used for the milking device according to the invention, should exhibit (at least) the following properties:

- A hardness between 25 shore A and 50 shore D
- A Young's modulus between 0.1 MPa and 50 MPa
- A tensile strength typically above 0.5 MPa
- A minimum elongation of 50% without breakage
- Optionally the milking device should exhibit
- A service temperature typically between −60 C and +200 C Suitably the material is resistant to acids, in particular formic acid, propionic acid, peracetic acid, and/or $H_2O_2$. The material is also preferably resistant to alkali, in particular to ammonia, NaOH and KOH, in concentrations commonly used in washing or cleaning procedures used in the dairy industry. The material should also be resistant to chlorine, ozone and to UV irradiation and thermal oxidation.

In preferred embodiments, the material exhibits a tear strength between 5 and 50 kN/m, preferably 15-35 kN/m.

In preferred embodiments, the material exhibits a tensile strength of 0.5-40 MPa, preferably 5-20 MPa.

It should also in preferred embodiment exhibit an elongation which is more than 200% before breakage, preferably more than 300%.

The material may be a thermoplastic vulcanisate (TPV), comprising two phases consisting of a thermoplastic continuous phase and a cross-linked rubber as a discontinuous phase, wherein the thermoplastic elastomer comprises a rubber selected from butadiene rubber; silicone; EPDM; NBR optionally grafted with acrylates or anhydrides.

The thermoplastic elastomer preferably also comprises a crystalline polyolefin selected from polyethylene (HDPE, LDPE or LCDPE), polypropylene, or mixtures thereof, for example copolymers. By virtue of the excellent processability of the materials selected in accordance with the invention, it becomes possible to tailor liners to a large number of different applications or needs within the field of milking. Thus, it is possible to manufacture liners in a simple molding process to high dimensional accuracy, while combining different materials in different parts of the product. E.g. it is possible to provide the head portion and milk tube with a higher rigidity than the flexible sleeve has.

A class of TPE materials which are suitable for the purposes of the invention are the SANTOPRENE® materials available from Advanced Elastomer Systems. These are thermoplastic elastomers suited for applications in contact with aqueous food and meet the requirements by the Directive 90/128/EC and its amendments. They can be processed by injection moulding and are fully recyclable.

Below are listed typical test values for three SANTOPRENE® materials (for injection moulded plaques, end gated 100 mm×150 mm×2 mm).

| X271-73EU | | | |
|---|---|---|---|
| Property | Value | Unit | Test Method |
| Hardness | 74 | Shore A | ASTM D 2240 (5s) |
| Hardness | 78 | Shore A | ISO 868 (15s) |
| Tensile strength | 7.0 | MPa | ISO 37 Type 1 |
| Elongation | 380 | % | ISO 37 Type 1 |

| X271-64EU | | | |
|---|---|---|---|
| Property | Value | Unit | Test Method |
| Hardness | 66 | Shore A | ASTM D 2240 (5s) |
| Hardness | 70 | Shore A | ISO 868 (15s) |
| Tensile strength | 5.5 | MPa | ISO 37 Type 1 |
| Elongation | 370 | % | ISO 37 Type |

| X271-55EU | | | |
|---|---|---|---|
| Property | Value | Unit | Test Method |
| Hardness | 58 | Shore A | ASTM D 2240 (5s) |
| Hardness | 62 | Shore A | ISO 868 (15s) |
| Tensile strength | 5.0 | MPa | ISO 37 Type |
| Elongation | 350 | % | ISO 37 Type |

Preferred values for the TPE material in a milking device according to the invention are a hardness of 50-90 shore A, and a tensile strength of 4-8 MPa.

The thermoplastic to be used for the stiffer parts of the device according to the invention should preferably have the following properties:

A Young's modulus between 800 and 8500 MPa, preferably between 1000 and 6500 MPA, most preferred between 1100 and 1300 MPa A tensile strength typically between 25 and 140 MPa, preferably 30-60 MPa, and more preferably 35-90 MPa.

The thermoplastic material can optionally be reinforced with glass fibers, in which case the overall tensile strength will be in the upper part of the above intervals. Other fillers selected from other fiber materials such as carbon fibers, mineral fibers, and other conventional fillers can be employed for specific applications according to need.

In a particular embodiment of the present invention, there is provided a teat cup liner wherein it is specifically the flexible teat receiving sleeve portion of the liner that is made of such a material or material combination. A liner 20 according to the invention is schematically illustrated in cross-section in FIG. 2, as mounted in a likewise schematically represented teat cup shell 21. The liner comprises a head portion 22, a flexible sleeve portion 24 for receiving a teat in a substantially close fit. By "close fit" is meant that there will be no significant amounts of air leaking in from between the teat and the sleeve in operation, i.e. during milking. The sleeve extends from the head portion 22 to a connecting part 27 where a short milk tube is connectable to the sleeve 24. Alternatively the milk tube can be integrated with the sleeve.

Figure 2:
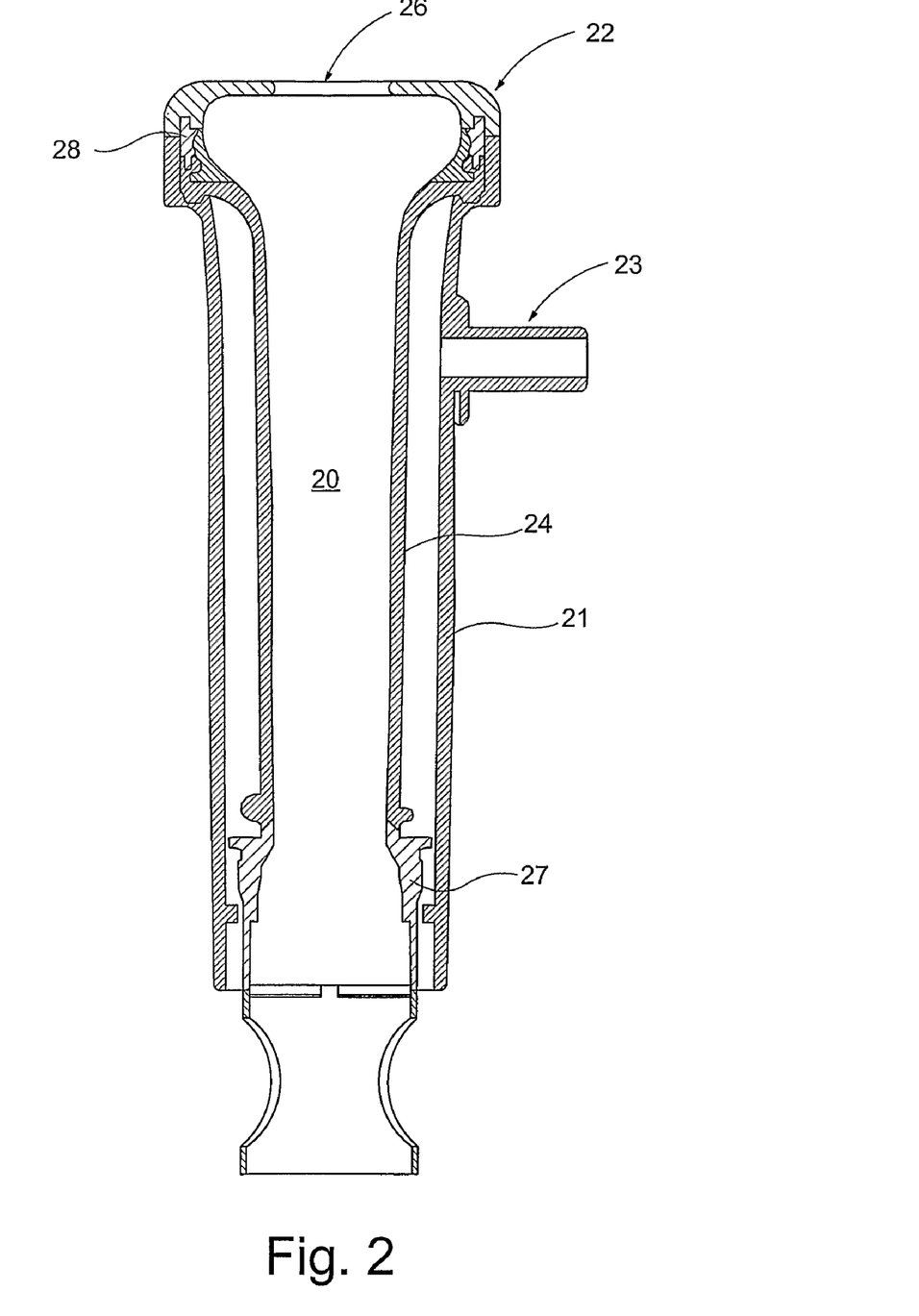
FIG. 2 is a schematic illustration of an embodiment of the invention in the form of a teat cup liner in cross section, embodying the concept of the present invention, namely that of using different materials in different parts.

Suitably the connecting part 27 is made from the stiffer material (thermoplastics) in order that the liner can be rigidly attached to the teat cup shell 21, so as not to cause leakage. It is important that the sleeve be fixed in a defined and particular position in the shell.

Furthermore, the teat cup shell is to be connected to a supply of pulsating medium in order that the sleeve of the liner be able to perform its function. This supply is provided via a pulsation tubing connectable to the teat cup shell 21 at an inlet connector 23, such that the pulsation can act on the sleeve 24.

The most important element of a liner is the flexible sleeve 24, in the sense that it is this element that performs the function by alternatingly collapsing and opening/expanding, caused by the pulsating vacuum applied. Thus, in order that the liner be able to fulfil its technical function, at least the flexible sleeve must meet certain criteria with respect to material properties.

A number of embodiments based on material selections and material combinations are possible. All such variations and modifications are applicable to all devices within the generic definition of the device according to the invention.

Thus, it is possible to make a device according to the invention (e.g. a liner, possibly comprising a short milk tubing and/or a short pulsation tubing) by using several variations or modifications in terms of material combinations, to provide for suitable properties for each specific use or application of the device according to the invention. Also, different parts of a device may be provided with different properties, adapted to the kind of environment that the specific part or portion of the device will come into contact with.

In particular it should be noted that it is within the inventive concept to use more than one TPE material in combination with one or more thermoplastic material. Thereby, e.g. the exterior surface of the flexible sleeve can be given different properties than the inner surface, such as different in terms of hydrophobic/hydrophilic properties. Various degrees of stiffness can also be achieved by using different grades of e.g polyolefins.

Now the method according to the invention will be described.

Suitably the devices described above are manufactured by injection molding of one or more materials according to the desired properties. Alternatively, if the structure is more complicated, injection molding or other molding techniques are preferred. Thus, devices comprising two or more materials in combination, i.e. forming a composite material, can be joined together in several ways. Dual injection of two (or more) materials in sequence in one and the same mold can be used. Another option is to make a "precursor" from one material in a first mold, and then move the "precursor" to a second mold in which one or more further materials are injected. It is also possible to injection mold or extrude the different components separately using different materials, and then weld the components together. Certain components or parts, can be coupled by simply putting one together with the other.

However, it will pertain to the field of the skilled man to design the molding processes in detail to obtain the desired structures and the set ups necessary to obtain them, and such methods will therefore not be discussed in further herein.

The method according to the invention for making a milking device, in particular a teat cup liner, is in a preferred embodiment a two-step molding process. However, it is within the inventive concept to perform more than two steps for making more complex structures.

Thus, in the first step, in a preferred embodiment, a thermoplastic, preferably polypropylene (PP) or polyamide (PA), is injected in a mold defining only those portions of the device that are to exhibit a higher stiffness or rigidity, such as couplings. The mold comprises a core defining an inner lumen of the device. The core, now carrying the above mentioned stiffer parts, is demolded from the mold, and placed in a second mold, into which, as a second molding step, a suitable TPE is injected. Alternatively, the core can be placed in a second cavity but in the same mold, or even in the same cavity if the mold is adjustable to a different shape, defining the second molding structure or component.

The second (and further if required) molding step defines the remaining portions of the device to be made. Because TPE and the thermoplastic are compatible, due to the fact that the matrix material of the TPE is very similar, if not identical to, the thermoplastic used in the first step, there will be a very good connection between the materials, and they will in practice be "welded" to each other. Transitions between the two materials, i.e. between stiffer and softer portions, will be near perfect. By "near perfect" we mean that there will be no perceivable steps or grooves where the two materials meet. Thus, bacteria or other micro-organisms and organic material, such as milk residues, serving as nutrition for bacteria cannot in fact become trapped in these transition regions. From a hygiene point of view this is essential, and an important feature of the method and of the device according to the invention.

In the upper part of a teat cup liner, where the teat is located in use, one can provide a stiffer part for providing coupling functionality, while at the same time keeping the actual teat contact surface smooth, such that the risk of causing sores on the teats is minimized or even eliminated.

In the particular embodiment shown in FIG. 2, the teat cup liner is made as two separate parts connectable by means of a snap fit coupling 28. Thus, the top or head portion, including the teat-receiving opening 26, is made as a "lid" 22 that can be connected to the remaining part comprising the actual flexible sleeve of the liner. Thereby, the lid is made in a two-step process. Thus, preferably the hard, ring shaped coupling portion is made in a first step, and while warm and still in place on the mold core, placed in a second mold where the TPE is injected to form the membrane portion having the teat receiving opening.

The sleeve part, having two couplings, one on the top (in the head portion) for connecting to the lid, and one at the bottom for connecting to a milk tubing or a teat cup shell is also made as outlined above in a two-step process.

Although the above described method wherein the stiff or hard parts are molded in the first step, and the soft or flexible parts are molded in the second step is the preferred way, it is possible to do it the other way around, i.e. to mold soft parts before the hard parts. There is no fundamental difference in the two approaches, and the skilled man can easily adjust molding parameters to suit either procedure.

For certain applications it may be required to use more than one TPE for different parts of a device, and/or more than one thermoplastic for different parts. In such a case, the manufacturing process may have to be performed in more than two steps, where one step is used for each material. However, it is also possible that two different materials can be injected simultaneously in different parts of the mold. Such variations in the process pertains to the field of the man skilled in the art, and is per se not part of the invention.

It is to be noted that due to the selection of materials, i.e. TPE in combination with thermoplastics, and due to the compatibility between these materials, it is very simple to tailor details in the design to specific needs.

As an example, it is a straight forward design option to introduce sealing rings directly within the harder portions of the device, by molding the TPE in suitable channels having a ring geometry. Because the materials integrate so well, there will be provided good sealing functionality.

The invention claim is:

1. A milking device comprising:
    a first part comprising a teat-receiving flexible sleeve, adapted to be positioned on/over a teat;
    a second part comprising top lid having a membrane with a teat-receiving opening; and
    a snap-fit coupling, said first part and said second part being connectable by said coupling so that said sleeve and said membrane form teat-receiving parts, wherein,
    said membrane and said sleeve comprise thermo-plastic elastomers (TPE), as defined in ISO 18064, so that said teat receiving parts comprise TPE, and
    said coupling is made of thermoplastic material selected from the group consisting of polyolefins, polyamides, and combinations thereof.

2. The milking device as claimed in claim 1, wherein,
    the TPE exhibits the following properties:
    a) a hardness between 25 shore A and 50 shore D;
    b) a Young's modulus between 0.1 MPa and 50 MPa;
    c) a tensile strength above 0.5 MPa; and
    d) a minimum elongation of 50% without breakage; and
    the thermoplastic material exhibits the following properties:
    i) a Young's modulus between 800 and 8500 Mpa; and
    ii) a tensile strength between 25 and 140MPa.

3. The milking device as claimed in claim 1, wherein said device has a service temperature between −60° C. and +200° C.

4. The milking device as claimed in claim 1, wherein the TPE in the is compatible with the thermoplastic material.

5. The milking device as claimed in claim 1, wherein the TPE material has
    a hardness of 50 - 90 shore A; and
    a tensile strength of 4 - 8 MPa.

6. The milking device as claimed in claim 1, wherein said thermoplastic material comprises polyolefins selected from the group consisting of polypropylenes (PP), polyethylenes (PE) and combinations thereof.

7. The milking device as claimed in claim 1, further comprising a third part comprising a TPE different from that of said first part.

8. The milking device as claimed in claim 1, wherein an exterior surface of of said sleeve is made from a different material from that of an inner surface of said sleeve.

9. The milking device as claimed in claim 8, wherein the the inner surface has a hydrophobicity different from the external surface.

10. The milking device as claimed in claim 1, comprising sealing elements integrated in the device, said sealing elements comprising a thermoplastic material different from the TPE.

11. The milking device as claimed in claim 1, wherein the thermoplastic material further comprises fillers selected from the group consisting of glass fibers, carbon fibers, mineral fibers, and metal fibers.

12. The milking device as claimed in claim 1, further comprising a bottom part serving as a connector for milk tubing, wherein
    said sleeve, said top portion connected to said sleeve via said coupling, and said bottom part in combination form a teat cup liner.

13. The milking device as claimed in claim 12, further comprising a short milk tubing, connected to the bottom part via snap-fit coupling that is made of a thermoplastic material.

14. A milking apparatus comprising a milking device as claimed in claim 1.

15. A method of making a milking device comprising first part comprising a teat-receiving flexible sleeve, adapted to be positioned on/over a teat, a second part comprising a top lid having a membrane with a teat-receiving opening, a snap-fit coupling, said first part and said second part being connectable by said coupling so that said sleeve and said membrane form teat-receiving parts, comprising the steps of:
    providing a mold having a cavity and a core;
    molding at least one part of said device in said mold using at least one first polymer material;
    molding at least one further part of said device using at least one second polymer material;
    optionally repeating the steps of molding as required by the design of the device, using the same or other polymer materials; wherein
    the at least one first polymer materials and at least one second polymer materials are selected from TPE, as defined in ISO 18064, and thermoplastic polymers, and
    the TPE is used for molding said sleeve and said membrane so that said teat-receiving parts comprise TPE, and
    the thermoplastic material is used for molding said coupling.

16. The method as claimed in claim 15, wherein in the first molding step, the first polymer material is the TPE, and in the second molding step, the second polymer material is the thermoplastic material.

17. The method as claimed in claim 15, wherein in the first molding step, the first polymer material is the thermoplastic material, and in the second molding step, the second polymer material is the TPE.

18. The method as claimed in claim 15, further comprising demolding after at least one of said first molding step or said second molding step the core carrying said at least one part, and placing the core in a second mold.

19. The method as claimed in claim 15, further comprising demolding after at least one of said first molding step or said second molding step the core carrying said at least one part, and placing the core in a second cavity in the same mold.

20. The method as claimed in claim 15, further comprising adjusting the mold to define a second shape for molding a further component.

\* \* \* \* \*